United States Patent Office 2,993,782
Patented July 25, 1961

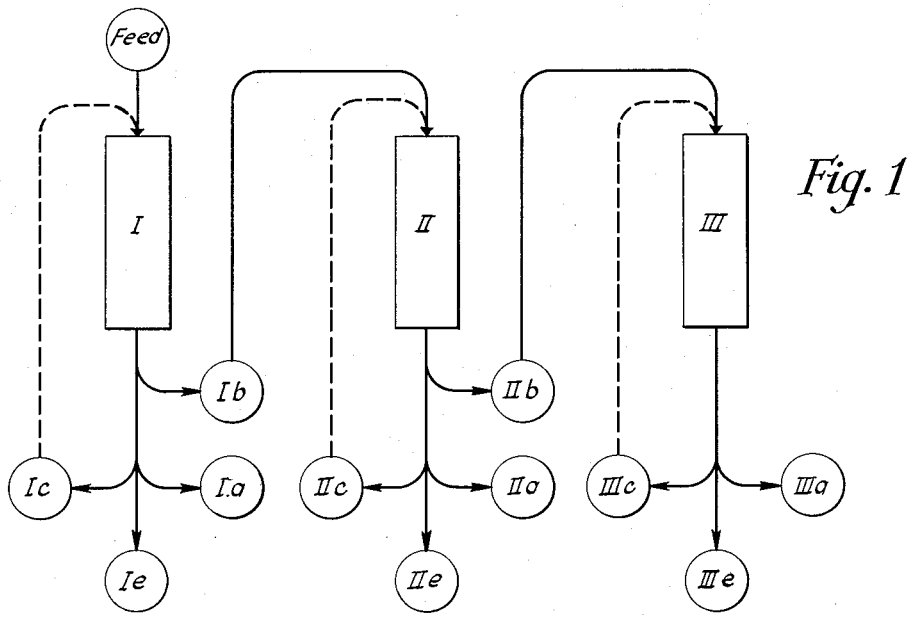

2,993,782
HYDROMETALLURGICAL SEPARATION OF NICKEL, COPPER, AND COBALT IN AMMONIACAL SOLUTIONS
Thomas C. Hampton, Alpena, and Richard A. Mock, Midland, Mich., assignors to The Dow Chemical Company, Midland, Mich., a corporation of Delaware
Filed Aug. 5, 1957, Ser. No. 676,320
12 Claims. (Cl. 75—108)

This invention relates to the separation of nickel, copper, and cobalt from ammoniacal aqueous solutions of the same in the form of ammine complex ions. It pertains particularly to the treatment of such solutions with chelate exchange resins and to a method and means whereby each of the metals can be obtained in a form substantially free of the others.

Many nickeliferous ores contain copper and cobalt. These metals can be, and conventionally are, extracted from such ores by operations that include leaching with aqueous ammonia, whereby there is obtained an ammoniacal aqueous solution of the metals in the form of their ammine complex ions.

The present invention is concerned particularly with ammoniacal aqueous solutions containing bivalent ammine complex ions of nickelous nickel having ammonia coordination of from two to six, i.e., having the formula $NiAm_{2-6}^{++}$, bivalent ammine complex ions of cupric copper having ammonia coordination of from two to four, i.e., having the formula $CuAm_{2-4}^{++}$, and trivalent ammine complex ions of cobaltic cobalt having ammonia coordination of from two to six, i.e., having the formula $CoAm_{2-6}^{+++}$, and most particularly with those in which the proportion of nickel is major, and which are substantially free of other metals. While such solutions are commonly obtained in extraction of nickeliferous ores and ore concentrates, the invention is not restricted to products of such origin, but is applicable to starting solutions of the kind described regardless of origin. For example, the invention is equally applicable to the treatment of such metal-containing ammoniacal aqueous solutions encountered in electrochemical practices, in pickling operations, or in other processes.

An object of the invention is to provide means for treatment of ammoniacal aqueous solutions containing ammine complexes of nickel, copper, and cobalt to separate these metals from each other.

A further object is to provide such means whereby each of such metals can be obtained in a form substantially free of the others.

Another object is to provide such means which are hydrometallurgical, i.e. employing aqueous solutions.

Other objects and advantages of this invention will be apparent in the following description.

The objects of this invention are attained by treating an ammoniacal aqueous solution containing ammine complexes of nickel, copper, and cobalt as defined above with certain chelate exchange resins. These chelate exchange resins contain amino carboxylic acid groups and are defined hereinafter.

FIGURE 1 of the drawing is a diagrammatic representation showing the flow of materials through the steps of one embodiment of the process.

FIGURE 2 is a chart showing the qualitative metal content of the several streams represented in FIG. 1.

Figure 3:
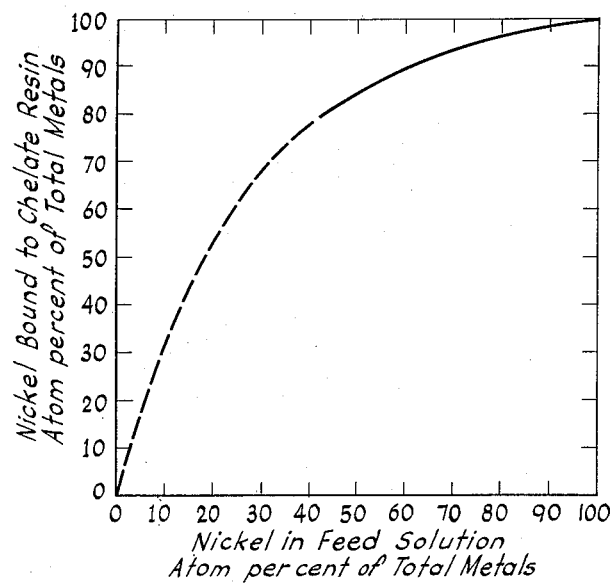
FIGURE 3 is a graphical representation of the relationship between the proportion of nickel in the metals contained in the starting solution and the proportion of nickel in the metals bound to the chelate exchange resin in equilibrium with such solution.

The method of the invention is practiced by providing at least two permeable beds of chelate exchange resin (described hereinafter) in the form of solid granules resembling the well-known ion-exchang resin beds. The number of beds employed is a matter of choice and depends in part upon the relative proportions of nickel, copper, and cobalt present in the solution to be treated and in part upon the degree of separation desired. These beds are interconnected for flow of aqueous solutions therethrough in a manner presently to be described.

Before beginning the actual process, the chelate exchange resins in the beds are conditioned by contacting the same with an ammoniacal aqueous conditioning solution, preferably one having a pH value of at least 8 and containing an ammonium salt such as ammonium sulfate, advantageously in sufficient amount such that the density of this solution is approximately the same as that of the metal-containing feed solution subsequently to be introduced. Such a solution places the carboxylic acid groups of the resin in the ammonium salt form and prepares the resin for reception of the metal-containing solution to be treated.

For purposes of discussion, operation of the invention in three beds will be described, and it will be presumed that the proportion of nickel is high relative to the total metals in the starting solution.

For convenience in describing the invention, the resin beds will be arbitrarily identified as beds I, II, and III, and reference is made to FIGURES 1 and 2 of the drawing wherein the Roman numerals identify such beds.

To bed I, a permeable bed of a solid chelate exchange resin immersed in an ammoniacal aqueous solution, is fed a stream of the starting ammoniacal aqueous solution containing ammine complexes of nickel, copper, and cobalt as hereinbefore described. Concurrent with the feeding of the starting solution to bed I there is displaced from bed I an effluent stream of liquid the first portion of which is the ammoniacal liquor originally in the bed.

As the flow of feed to, and effluent from, bed I continues, the metal complex ions in the feed solution in contact with the chelate exchange resin in such bed undergo chelate exchange reactions with the active groups on the resin. In the group nickel, copper, and cobalt, nickel is most preferred by the resin, forming the most stable chelate complex structures therewith, and the cobalt is least preferred by the resin, forming the least stable chelate complexes therewith, under the conditions defined for this process. As the metal-containing solution flows through the resin bed, all of the metal ions are first sequestered by the resin. However, the resin-bound cobalt is promplty displaced by ions of copper and nickel, the resin-bound copper being in turn displaced by ions of nickel.

The first metal to appear in the effluent from bed I is cobalt, whereupon the taking of an effluent fraction identified as I$a$ is begun. Fraction I$a$, comprising cobalt and substantially free of other metals, is taken until copper appears in the effluent stream, at which point fraction I$a$ is terminated, and fraction I$b$ is commenced.

While taking effluent fraction I$b$, nickel appears in the effluent, and fraction I$b$ is terminated when the rate of change of the copper content of the whole fraction I$b$ relative to the rate of change of the nickel content of such total fraction I$b$ is at the minimum. Fraction I$b$ will be used as feed to bed II as described presently.

With the termination of fraction I$b$, the resin bed I will be found largely in the nickel form, with lesser amounts of copper, and little if any cobalt, bound on the resin. By continuing the flow of starting solution to bed I (after terminating fraction I$b$) and taking a further effluent fraction Ic until the composition thereof is substantially the same as the composition of the starting feed solution, bed I is thereby converted to a metal form having the highest proportion of nickel consistent with the composition of the feed solution.

The elution of the bound metals from bed I will be described later. Effluent fraction Ic can be returned to bed I as part of the feed thereto in another cycle of operation after regeneration of the resin.

Fraction Ib, described above and containing copper, cobalt, and a diminished proportion of nickel (each in the form of ammine complexes as in the starting solution), is then fed to bed II, similar to bed I, being a permeable bed of a solid chelate exchange resin immersed in an ammoniacal aqueous solution. There is thereby displaced from bed II an effluent liquid stream, the first portion of which is the aqueous solution originally in the bed.

During passage through the resin bed, the metal ions in solution undergo chelate exchange reactions analogous to those just described as occurring in bed I. Accordingly, as in operation of bed I, the effluent from bed II is taken in a sequence of fractions.

Fraction IIa is commenced when cobalt appears in the effluent; fraction IIa, containing only cobalt, is terminated, and fraction IIb is commenced, when copper appears in the effluent stream.

Fraction IIb, containing only copper and cobalt, is taken until nickel appears in the effluent stream, whereupon fraction IIb is terminated, and the taking of effluent fraction IIc is commenced. Fraction IIb will be fed to bed III as presently described.

With the termination of fraction IIb, the resin bed II will be found to contain chelate-bound nickel and copper, with little, if any, cobalt. By continuing the flow of fraction Ib to bed II, and taking effluent fraction IIc until the composition thereof is substantially the same as the composition of the feed solution Ib, the proportion of nickel chelate-bound to the resin will be at a maximum for that particular feed composition, but less than that maximum proportion of nickel chelate-bound to the resin in bed I.

The elution of the bound metals from bed II will be described later. Effluent fraction IIc can be returned to bed II as part of the feed thereto in another cycle of operation after regeneration of the resin.

Fraction IIb, described above and containing copper and cobalt (but devoid of nickel) in the form of ammine complexes, is then fed to bed III, also being a permeable bed of a solid chelate exchange resin immersed in an ammoniacal aqueous solution. There is thereby displaced from bed III an effluent liquid stream, the first portion of which is the aqueous solution originally in the bed.

During passage through resin bed III, the metal ions in solution undergo chelate exchange reactions analogous to those previously described as occurring in beds I and II. As in the other beds, the effluent from bed III is taken in a sequence of fractions.

Fraction IIIa is commenced when cobalt appears in the effluent. Fraction IIIa, containing only cobalt, is terminated, and taking of effluent fraction IIIb is commenced, when copper appears in the effluent stream.

With the appearance of copper in the effluent stream and the termination of fraction IIIa, resin bed III will be found to contain largely copper, and very little cobalt, in chelate form. By continuing the flow of the feed steam IIb to bed III, and taking an effluent fraction IIIc until the composition of the effluent stream is the same as the composition of the feed stream, the resin bed III can be converted substantially to the copper form.

The copper bound to bed III can be eluted as presently described. Effluent fraction IIIc can be returned to bed III as part of the feed thereto in another cycle of operation after regeneration of the resin.

The foregoing steps of loading resin beds I, II, and III can be carried out with a starting solution in which the metals nickel, copper, and cobalt can be present (in the form of their ammine complexes as described) at any desired concentration. The nature of the anions associated with the metal complexes is without effect on the operation of this process when they are anions of the group comprising sulfate, sulfamate, thiosulfate, trithionate, sulfite, chloride, bromide, iodide, nitrate, or acetate. The starting solution can be fed at any temperature up to its boiling point.

The flow of solutions through the chelate resin beds can be in any desired direction, i.e. upward, downward, or transversely. The rate of flow can usually be up to approximately 0.2 gallon per square foot (cross section of the resin bed normal to the direction of flow) per minute.

The solid chelate resin in the beds is usually in the form of granules, or other small pieces such as spheroidal beads, having sizes in the range from 20 to 120, preferably 40 to 60, mesh size (corresponding to United States Standard Sieves).

It should be understood that each or any of the beds I, II, and III in FIGURE 1 may in practice be a plurality of beds. The invention may be practiced in batch, continuous, or intermittent manner, or in other ways evident to one skilled in the art in view of this disclosure.

After loading beds I, II, and III in the manner described, the chelate-bound metals thereon can be eluted and the bed can be regenerated. Usually, the residual liquor remaining in the beds after terminating fractions Ic, IIc, and IIIc, respectively, is drained from the bed or is preferably displaced therefrom by an alkaline aqueous saline solution such as an ammonium hydroxide solution to remove from the interstices of the bed the metals that are not chelate-bound to the resin.

The metals bound to the resin bed can be recovered by passing through the bed an eluting liquid capable of decomposing the chelate complexes of the resin with nickel, copper, and/or cobalt, the eluting liquid advantageously being an aqueous acid such as hydrochloric or sulfuric acid. Although the eluate is usually not taken in fractions, in some instances it may be advantageous to do so.

From bed I (referring again to the drawing), the eluate, identified as fraction Ie, contains nickel and more or less copper, depending in part on the composition of the feed material. In general, the proportion of nickel chelate-bound to the resin in bed I is related to the composition of the starting solution fed to bed I approximately as shown in Table 1 and graphically in FIG. 3 of the drawing.

TABLE 1

| Nickel in Feed Solution, atom percent of total metals | Nickel Bound to Resin, atom percent of total metals |
| --- | --- |
| 87.5 | 98.4+ |
| 79.9 | 96.2+ |
| 61.4 | 89.9+ |
| 48.7 | 83.4+ |

In each case, the figures in Table 1 are for instances where the remaining metal is largely copper, cobalt being small in proportion. In instances where the feed solution contains nickel and cobalt with only small proportions of copper, the proportion of nickel bound to the resin is, in each instance, higher than shown in Table 1.

The elution of bed II results in an eluate fraction IIe which also contains nickel and more or less copper, depending in part on the composition of the feed stream Ib before described. In general, the proportion of nickel chelate-bound to resin bed II is related to the composition of the feed stream Ib approximately as shown above in Table 1 and FIG. 3, and is usually smaller than that in bed I.

When the starting solution fed to bed I is rich in nickel, e.g. approximately 87 or more atom percent nickel, the eluate from bed I is 98.4 or more atom percent nickel based on total metals. In general, when the starting feed solution contains 75 or more atom percent nickel based on the total metals in the feed, it is advantageous to employ three resin beds in the manner described above.

When the starting solution fed to bed I contains not more than 75 atom percent nickel, based on the total metals in that solution, that feed resembles the one described earlier as being fed to bed II, in which case the starting solution can be fed directly to bed II in the stead of stream I$b$, i.e. bed I and its operation can be obviated, and the process can be operated as a two-bed system employing only beds II and III as described above. Any effluent fraction containing only ammine complexes of copper and cobalt and substantially free of nickel can be fed directly to bed III or its equivalent.

The eluate II$e$ from bed II is very much richer in nickel than the feed thereto. Eluate fractions still richer in nickel can be obtained from bed II by taking a sequence of fractions instead of a single fraction II$e$ and selecting those fractions in which the copper and/or cobalt content is low relative to nickel. Nickel-rich eluates from bed II can be still further enriched by making the same ammoniacal, thereby converting the metals to ammine complexes, and feeding the resulting solution to bed I or its equivalent.

Another variant on the steps of operation is possible. The resin bed II after terminating effluent fraction II$b$ or II$c$ as hereinbefore described can be treated with the same starting solution that is fed to bed I. The resin in bed II can thereby be converted to a metal form in which the proportion of nickel based on total metals is as large as it is in bed I.

Since the metals chelate-bound to bed III are free of nickel and may consist substantially of copper, the elution of bed III, e.g. with acid, produces an eluate fraction III$e$, that is free of nickel, and wherein the metal may consist essentially of copper.

The elution of beds I, II, and III with an acid eluent leaves the aminocarboxylic acid resin in the acid form. To regenerate the resin bed and to prepare the same for another cycle of loading with metals, the resin beds are advantageously rinsed with water, and then are treated with an ammoniacal aqueous solution, preferably one having a pH value of at least 8 and containing an ammonium salt such as ammonium sulfate, like the conditioning solution hereinbefore described. This treatment places the carboxylic acid groups of the resin in the ammonium salt form and prepares the resin for another cycle of treatment of the chelate-forming metal-containing starting solutions as hereinbefore described.

The chelate exchange resins with which this invention is concerned are ones that have in their polymeric structure recurring units at least 80 percent by weight of which correspond to an ar-vinylbenzylamino dicarboxylic acid and are representable by the formula

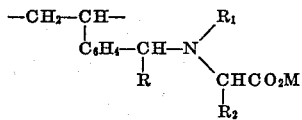

wherein one and only one of the symbols $R_1$ and $R_2$ represents the radical

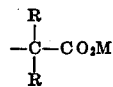

the other of the symbols $R_1$ and $R_2$ representing hydrogen or the methyl radical, and wherein the symbol R represents hydrogen or the methyl radical, and the symbol M represents a cation selected from the group consisting of hydrogen, alkali metals, alkaline earth metals, and ammonium, and the other symbols have their customary meanings.

Formulae of these kinds of recurrent units can be illustrated by the sub-formulae:

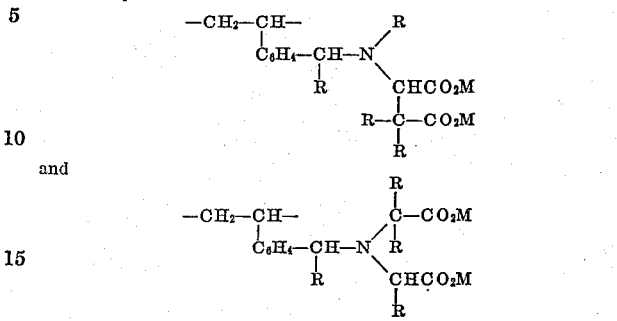

wherein the symbols have the meanings ascribed above.

Specific examples of chelate exchange resins represented by the foregoing formulae and contemplated by this invention are the polymers of N-(ar-vinylbenzyl) iminodiacetic acid and the polymers of N-(ar-vinylbenzyl) aspartic acid (in each of which the symbols R represent hydrogen atoms in the two formulae last given above). Other examples of such chelate exchange resins are the polymers of N-($\alpha$-methyl-ar-vinylbenzyl)-iminodiacetic acid, N-($\alpha$-methyl-ar-vinylbenzyl) aspartic acid, N-(ar-vinylbenzyl)-$\alpha,\alpha'$-iminodipropionic acid, and N-methyl-N-(ar-vinylbenzyl) aspartic acid.

Monomeric vinylbenzyl aliphatic aminodicarboxylic acids suitable for making the resins required by this invention are described in pending application, Serial No. 615,509, filed October 12, 1956 by Richard A. Mock et al., now U.S. Patent No. 2,840,603, granted June 24, 1958. According to the method described therein, ar-vinylbenzyl chloride is reacted with disodium iminodiacetate in alkaline aqueous medium, and the reaction mixture is acidified to produce N-(ar-vinylbenzyl) iminodiacetic acid. In another example, ar-vinylbenzylamine is condensed with diethyl maleate to obtain diethyl N-(ar-vinylbenzyl) aspartate which is hydrolyzed to provide N-(ar-vinylbenzyl) aspartic acid. Ar-vinylbenzylamine can also be reacted with sodium chloroacetate in alkaline aqueous media to produce N-(ar-vinylbenzyl) iminodiacetic acid.

In pending application Serial No. 615,508, filed October 12, 1956, by Leo R. Morris, now U.S. Patent No. 2,875,162, granted February 24, 1959, polymers of the afore-mentioned vinylbenzyl aliphatic aminodicarboxylic acids are described.

In pending application Serial No. 615,467, filed October 12, 1956, by Richard A. Mock et al., now U.S. Patent No. 2,910,445, granted October 27, 1959, interpolymers of the afore-mentioned vinylbenzyl aliphatic aminodicarboxylic acids and one or more other polymerizable ethylenically unsaturated compounds such as styrene, divinylbenzene, and acrylonitrile are described.

In pending application Serial No. 615,486, filed October 12, 1956, by Leo R. Morris, now U.S. Patent No. 2,888,441, granted May 26, 1959, there is described a method that comprises reacting an ar-vinylbenzylamine polymer with a haloacetic acid in an alkaline aqueous medium to convert the amino groups to iminodiacetic acid groups. For example, polymeric ar-vinylbenzylamine is reacted in aqueous alkali with sodium chloroacetate to produce polymeric N-(ar-vinylbenzyl) iminodiacetic acid.

The vinylbenzyl aliphatic aminodicarboxylic acid polymers of the kind just described and required for practice of this invention are characterized by containing at least 80 percent by weight of vinylbenzyl aliphatic aminodicarboxylic acid units. The vinylbenzyl aliphatic aminodicarboxylic acid polymers are generally hard, solid, resinous bodies that are insoluble, but swellable, in aqueous media. These resinous polymers are further characterized and distinguished by a relatively open gel structure. All of these resinous are highly swollen when saturated with water at a high pH, e.g. pH values of 10 or more.

The following example specifically illustrates one embodiment of the invention but should not be construed as limiting its scope. In the example reference is made to the figures of the drawing.

*Example*

The chelate exchange resin employed in this example was a water-insoluble, crosslinked, copolymer of N-(ar-vinylbenzyl)aspartic acid. This chelate exchange resin was prepared in the following manner.

In a reaction vessel were mixed 48 g. of technical ar-vinylbenzylamine and 90 g. of diethyl maleate in 60 ml. of ethanol. The ar-vinylbenzylamine was a mixture of isomers consisting essentially of approximately 60 percent by weight of p-vinylbenzylamine and approximately 40 percent by weight of o-vinylbenzylamine. The resulting reaction mixture was kept at room temperature for three days under an atmosphere of nitrogen. The resulting solution was diluted with four volumes of water, acidified to pH of 2 with concentrated hydrochloric acid, and extracted with approximately 45 ml. of chloroform. The water layer was made alkaline by addition of sodium hydroxide to pH 10 and was extracted with chloroform. The latter chloroform extract was condensed by vaporization of chloroform under vacuum, leaving approximately 90 g. of residue consisting essentially of diethyl N-(ar-vinylbenzyl)aspartate.

A mixture of 85 g. of diethyl N-(ar-vinylbenzyl)aspartate (prepared in the manner just described), 4.5 g. of technical divinylbenzene (containing approximately 55 percent by weight divinylbenzene, 35 percent ethylvinylbenzene, and 10 percent diethylbenzene, these being mixed isomers, predominately meta- and para-isomers), 0.9 g. of sodium ar-vinylbenzenesulfonic acid, 0.9 g. of azobisisobutyronitrile, and 400 ml. of water is stirred and heated to 40°–50° C. After addition of 100 ml. of 1 percent by weight aluminum sulfate aqueous solution, the resulting dispersion is heated to 100° C. and vigorously stirred for three hours, after which the mixture is heated without stirring for 18 hours on steam. The polymer beads are collected, and washed with water and with acetone and again with water.

Beads of resinous polymer so obtained are then suspended in 15 percent by weight sulfuric acid and heated at reflux for 18 hours to hydrolyze the ester groups. After washing with water, the resin beads, having diameters in the range from approximately 0.01 inch to approximately 0.03 inch, are ready for use as described below.

Chelate resin beads of the kind just described were placed in each of three glass columns, of the kind used for ion-exchange reactions, 18 inches in length and having an inside diameter of 1 inch.

The resin beds were conditioned by passing through the beds an ammoniacal aqueous conditioning solution having the following composition:

$(NH_4)_2SO_4$, 1.03 M
$NH_4OH$, to pH 9

The resin beds were left immersed in such solution pending introduction of the metal-containing starting solutions to be treated.

The starting solution was ammoniacal and had the following composition (percents by weight):

|  | Percent | M |
|---|---|---|
| $Ni(NH_3)_6SO_4$ | 16.9 | 0.73 |
| $Cu(NH_3)_4SO_4$ | 2.0 | 0.098 |
| $(Co(NH_3)_6)_2(SO_4)_3$ | 0.6 | 0.0108 |
| $H_2NSO_3NH_4$ | 3.6 | 0.35 |
| $(NH_4)_2SO_4$ | 13.6 | 1.03 |
| $NH_4OH$ to pH 9 | | |
| $H_2O$ | 63.3 | |

This starting solution was fed into the first of the chelate exchange resin columns described above, designated column I and corresponding to bed I in FIG. 1 of the drawing. The solution was fed to the bottom of the column and thereby displaced liquid from the top of the column at a substantially constant rate of approximately one drop per second. The effluent from column I was collected in small portions or cuts. The first metal-containing effluent cut comprised cobalt. The feed was continued, and the effluent cuts were taken from column I until the composition of the effluent stream was the same as that of the feed.

The effluent cuts from column I were analyzed for nickel, copper, and cobalt. The ratio of the molar concentration of each of these metals in each of these cuts to the molar concentration of that metal in the feed solution was calculated, i.e. the ratio $C/C_0$ where C is the concentration of the metal in the effluent cut and $C_0$ is the concentration of that metal in the starting solution.

Figure 4:
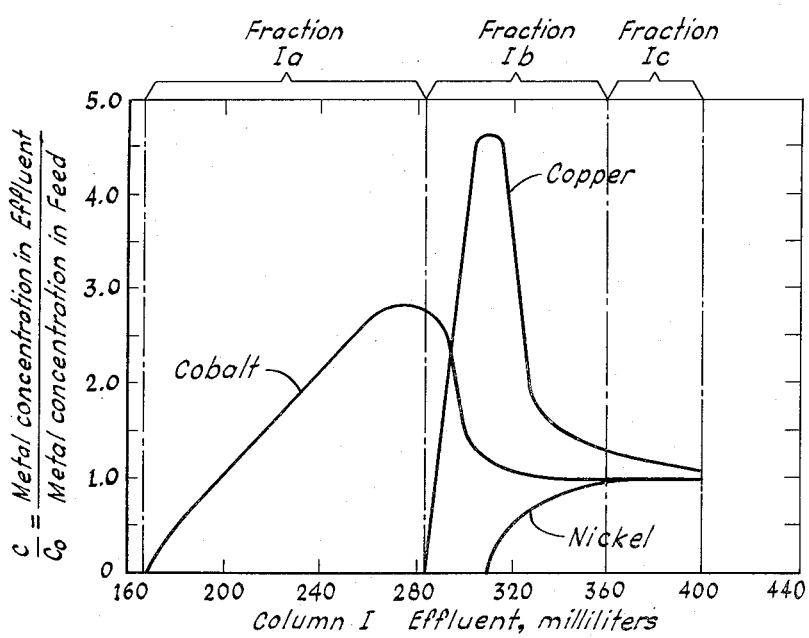
FIGURES 4, 5 and 6 are graphical representations showing the metal content of the effluent solutions described in connection with the example.

The results of these analyses and computations are shown graphically in FIG. 4 of the drawing, wherein the values of $C/C_0$ for the cuts of the effluent are plotted versus the total volume of effluent, in milliliters.

The effluent cuts were combined into fractions Ia, Ib, and Ic as shown in FIG. 4. The composite fractions had the following analyses (the analysis of the feed being set down for comparison, the values being molarities):

|  | Feed | Fraction Ia | Fraction Ib | Fraction Ic |
|---|---|---|---|---|
| Nickel | 0.807 | | 0.266 | 0.806 |
| Copper | 0.102 | | 0.204 | 0.130 |
| Cobalt | 0.011 | 0.0169 | 0.017 | 0.011 |

After taking the effluent cuts from column I as described, the liquid was drained and blown from the resin bed, and the resin was eluted with 250 ml. of 6 N hydrochloric acid passed through the bed at an average rate of approximately one drop per second. The eluate fraction (identified as Ie) was analyzed, and was found to contain 0.590 M nickel as the chloride. In commercial practice, perhaps only the most concentrated (i.e. highest nickel-containing) portions of the eluate might be saved, the more dilute portions being employed as part of the eluent in a subsequent cycle of elution of the resin.

In the test just described the copper content of the eluate from column I was less than 0.5 percent of the total metal content in such eluate.

A quantity of ammoniacal aqueous solution containing nickel, copper, and cobalt in the proportions obtained as effluent fraction Ib from column I as described above was passed as feed material into the second of the chelate exchange resin columns hereinbefore described and identified as column II, corresponding to bed II in FIG. 1 of the drawing. The metals were in the form of their ammine complexes, and the liquor contained ammonium sulfate and ammonium hydroxide as described above for the feed to column I.

The solution was fed to the bottom of column II and thereby displaced liquor from the top of the column at a substantially constant rate of approximately one drop per second. The effluent from column II was collected in small portions or cuts. As in column I, the first metal to appear in the effluent was cobalt. The feed was continued, and effluent cuts were taken from column II until the composition of the effluent stream was the same as that of the feed.

The effluent cuts from column II were analyzed for nickel, copper, and cobalt. The ratio $C/C_0$ for each metal was calculated as described in connection with the operation of column I.

Figure 5:
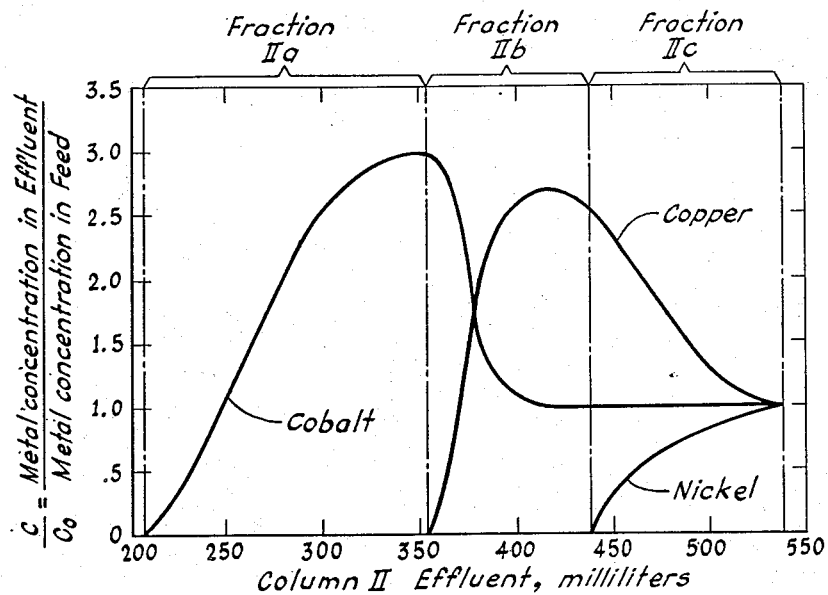

The results of these analyses and computations are shown graphically in FIG. 5 of the drawing, wherein the values of $C/C_0$ for the cuts of the effluent are plotted versus the total volume of effluent, in milliliters.

The effluent cuts were combined into fractions IIa, IIb, and IIc as shown in FIG. 5. The composite fractions had the following analyses (the analysis of the feed being set down for comparison, the values being molarities):

|         | Feed  | Fraction IIa | Fraction IIb | Fraction IIc |
|---------|-------|--------------|--------------|--------------|
| Nickel  | 0.266 |              |              | 0.230        |
| Copper  | 0.204 |              | 0.470        | 0.305        |
| Cobalt  | 0.017 | 0.0255       | 0.025        | 0.017        |

After taking the effluent cuts from column II as described, the liquid was drained and blown from the resin bed, and the resin was eluted by passing 250 ml. of 6 N hydrochloric acid through the bed at an average rate of approximately one drop per second. The eluate fraction (identified as IIe) was analyzed, and was found to contain:

|        | M     |
|--------|-------|
| Nickel | 0.460 |
| Copper | 0.115 |

A quantity of ammoniacal aqueous solution containing copper and cobalt in the form and proportions obtained as effluent fraction IIb from column II as just described was passed as feed material into the third of the chelate exchange resin columns hereinbefore described and identified as column III, corresponding to bed III in FIG. 1 of the drawing.

The solution was fed to the bottom of column III and thereby displaced liquor from the top of the column at a substantially constant rate of approximately one drop per second. The effluent from column III was collected in small cuts, as hereinbefore described for the operation of columns I and II, until the composition of the effluent stream from column III was the same as that of the feed to such column.

Figure 6:
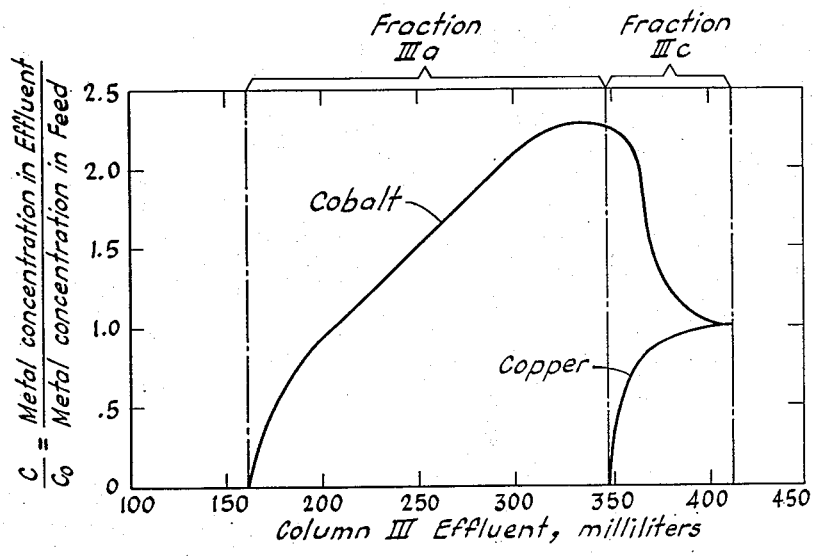

The effluent cuts from column III were analyzed, the ratio $C/C_0$ for each metal was calculated as described hereinbefore, and the values of the ratio $C/C_0$ were plotted versus the total volume of effluent, in milliliters, as shown graphically in FIG. 6 of the drawing.

The effluent cuts were combined into fractions IIIa and IIIc as shown in FIG. 6. (To facilitate comparison with the operation of columns I and II, there is no effluent fraction designated IIIb.) The composite fractions gave the following analyses (the analysis of the feed being set down for comparison, the values being molarities):

|         | Feed  | Fraction IIIa | Fraction IIIc |
|---------|-------|---------------|---------------|
| Copper  | 0.470 |               | 0.405         |
| Cobalt  | 0.025 | 0.039         | 0.041         |

After taking the effluent cuts from column III as described, the liquid was drained and blown from the resin bed, and the resin was eluted by passing 250 ml. of 6 N hydrochloric acid through the bed at an average rate of approximately one drop per second. The eluate fraction (identified as IIIe) was analyzed and was found to contain 0.640 M copper as cupric chloride, there being substantially no other metals in the eluate.

After elution of columns I, II, and III with hydrochloric acid as described above, the chelate exchange resins in such columns were rinsed with water and were reconditioned by passing through the beds a further quantity of the ammoniacal aqueous conditioning solution described in the early part of the example. The resin beds were thereby regenerated and made ready for another cycle of the operations described above.

In place of the N-(ar-vinylbenzyl)aspartic acid, resin employed in this example, there can be employed an N-(ar-vinylbenzyl)iminodiacetic acid resin, or an equivalent N-(ar-vinylbenzyl)amino dicarboxylic acid chelate exchange resin as hereinbefore described, with substantially the same results.

The foregoing example illustrates the treatment of an ammoniacal aqueous solution containing ammine complexes of nickel, copper, and cobalt whereby each of the metals was obtained in a form substantially free of the others. Cobalt, substantially free of copper and nickel, was obtained in effluent fractions Ia, IIa, and IIIa. Copper, substantially free of cobalt and nickel, was obtained in the eluate IIIe. Nickel, substantially free of copper and cobalt, was obtained in the eluate Ie.

On the basis of this description, those skilled in the art will be able to perceive other ways in which the invention can advantageously be practiced.

That which is claimed is:

1. A method for the selective separation from each other of nickel, copper, and cobalt in an ammoniacal aqueous starting solution containing the same in the form of bivalent ammine complex ions of nickelous nickel having ammonia coordination of from two to six, bivalent ammine complex ions of cupric copper having ammonia coordination of from two to four, and trivalent ammine complex ions of cobaltic cobalt having ammonia coordination of from two to six, which method comprises feeding such solution to a first permeable bed of a solid chelate exchange resin immersed in an ammoniacal aqueous solution, thereby displacing liquid from the bed in a sequence of effluent fractions, withdrawing from the bed an effluent fraction comprising cobalt, terminating that fraction when copper appears in the effluent, withdrawing from the bed the succeeding effluent fraction comprising cobalt and copper, and terminating that fraction when nickel appears in the effluent; passing the last described fraction as a feed solution to a second permeable bed of a solid chelate exchange resin immersed in an ammoniacal aqueous solution, thereby displacing liquid from the bed in a sequence of effluent fractions, withdrawing from the bed an effluent fraction comprising cobalt, and terminating that fraction when copper appears in the effluent; the solid chelate exchange resin in each of the beds being a water-insoluble, water-swollen, solid polymeric resin containing recurring units at least 80 percent by weight of which correspond to an ar-vinylbenzylamino dicarboxylic acid and are representable by the formula

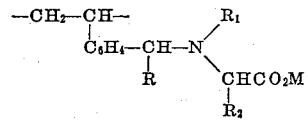

wherein one and only one of the symbols $R_1$ and $R_2$ represents the radical

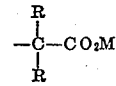

the other of the symbols $R_1$ and $R_2$ representing a member of the group consisting of hydrogen and the methyl radical, the radicals represented by the symbol R being selected from the group consisting of hydrogen and the methyl radical, and the symbol M represents a cation selected from the group consisting of hydrogen, alkali metals, alkaline earth metals, and ammonium.

2. A method according to claim 1 which comprises the further steps of continuing to feed the specified solution to at least one of the beds and withdrawing further effluent solution from at least that bed until the composition of the effluent solution therefrom is substantially the same as the composition of the solution fed to that bed.

3. A method according to claim 1 wherein the proportion of nickel in the starting solution is not more than 75 atom percent based on the total metals in that starting solution.

4. A method according to claim 1 wherein the chelate exchange resin in at least one of the beds contains at least 80 percent by weight of N-(ar-vinylbenzyl)iminodiacetic acid polymerically combined therein.

5. A method according to claim 1 wherein the chelate exchange resin in at least one of the beds contains at least 80 percent by weight of N-(ar-vinylbenzyl)aspartic acid polymerically combined therein.

6. A method for the selective separation from each other of nickel, copper, and cobalt in an ammoniacal aqueous starting solution containing the same in the form of bivalent ammine complex ions of nickelous nickel having ammonia coordination of from two to six, bivalent ammine complex ions of cupric copper having ammonia coordination of from two to four, and trivalent ammine complex ions of cobaltic cobalt having ammonia coordination of from two to six, which method comprises feeding such starting solution to a permeable bed I of a solid chelate exchange resin immersed in an ammoniacal aqueous solution, thereby displacing liquid from bed I in a sequence of effluent fractions, withdrawing from bed I an effluent fraction I$a$ comprising cobalt, terminating fraction I$a$ when copper appears in the effluent, withdrawing from bed I the succeeding effluent fraction I$b$ comprising copper and nickel, and terminating fraction I$b$ when the rate of change of the copper content of the total fraction I$b$ relative to the rate of change of nickel content of such total fraction I$b$ is at the minimum; passing fraction I$b$ as a feed solution to a permeable bed II of a solid chelate exchange resin immersed in an ammoniacal aqueous solution, thereby displacing liquid from bed II in a sequence of effluent fractions, withdrawing from bed II an effluent fraction II$a$ comprising cobalt, terminating fraction II$a$ when copper appears in the effluent, withdrawing from bed II the succeeding effluent fraction II$b$ comprising cobalt and copper, and terminating fraction II$b$ when nickel appears in the effluent; passing fraction II$b$ as a feed solution to a permeable bed III of a solid chelate exchange resin immersed in an ammoniacal aqueous solution, thereby displacing liquid from bed III in a sequence of effluent fractions, withdrawing from bed III an effluent fraction III$a$ comprising cobalt, and terminating fraction III$a$ when copper appears in the effluent; the solid chelate exchange resin in each of beds I, II, and III being a water-insoluble, water-swollen, solid polymeric resin containing recurring units at least 80 percent by weight of which correspond to an ar-vinylbenzylamino dicarboxylic acid and are representable by the formula

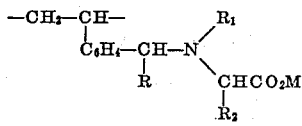

wherein one and only one of the symbols $R_1$ and $R_2$ represents the radical

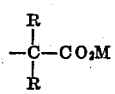

the other of the symbols $R_1$ and $R_2$ representing a member of the group consisting of hydrogen and the methyl radical, the radicals represented by the symbol R being selected from the group consisting of hydrogen and the methyl radical, and the symbol M represents a cation selected from the group consisting of hydrogen, alkali metals, alkaline earth metals, and ammonium.

7. A method according to claim 6 wherein the proportion of nickel in the starting solution is at least 75 atom percent based on the total metals in that starting solution.

8. A method according to claim 7 which comprises the further steps of continuing to feed the specified solution to at least one of the beds I, II, and III after terminating the corresponding fractions I$b$, II$b$, and III$a$ as described, and continuing to withdraw effluent solution from at least that one bed until the composition of the effluent solution therefrom is substantially the same as the composition of the solution fed to that bed.

9. A method according to claim 7 which comprises the further steps of continuing to feed the starting solution to bed I after terminating fraction I$b$ and withdrawing effluent from bed I until the composition thereof is substantially the same as the composition of the starting solution.

10. A method according to claim 7 which comprises the further steps of continuing to feed fraction II$b$ to bed III after terminating fraction III$a$ and withdrawing effluent from bed III until the composition thereof is substantially the same as the composition of fraction II$b$.

11. A method according to claim 7 wherein the chelate exchange resin in at least one of the beds contains at least 80 percent by weight of N-(ar-vinylbenzyl)iminodiacetic acid polymerically combined therein.

12. A method according to claim 7 wherein the chelate exchange resin in at least one of the beds contains at least 80 percent by weight of N-(ar-vinylbenzyl)aspartic acid polymerically combined therein.

References Cited in the file of this patent

UNITED STATES PATENTS

| | | |
|---|---|---|
| 2,184,943 | Pattock et al. | Dec. 26, 1939 |
| 2,632,001 | McMaster et al. | Mar. 17, 1953 |
| 2,694,702 | Jones | Nov. 16, 1954 |
| 2,697,080 | D'Alelio | Dec. 14, 1954 |

OTHER REFERENCES

Atkins et al. in "Journal of American Chemical Society," vol. 74, pages 3527–9 (1952).

Martell et al.: "Chemistry of the Metal Chelate Compounds," publ. by Prentice-Hall, Inc., New York (1952). (Pages 433, 434, 477, 532, 533 and 535 relied on.)